H. K. Nelson.
Plant Protector.
Nº 96,468.                    Patented Nov. 2, 1869.
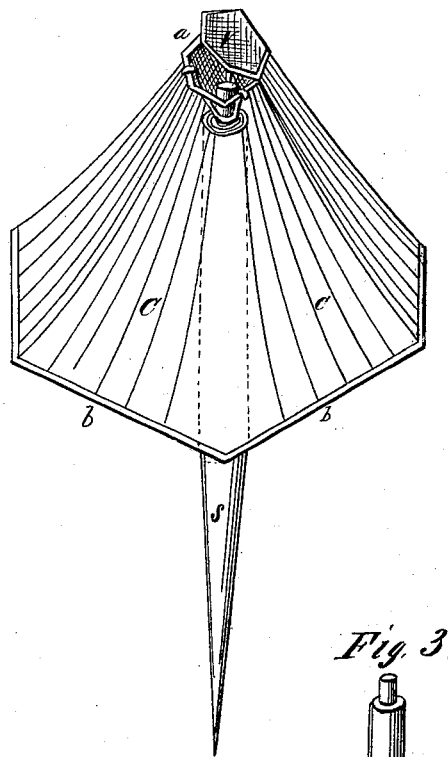
Witnesses:                    Inventor:
F. P. Mulbry                  H. K. Nelson
Alfred. H. Lee                per N. DuBois
                              Atty.

United States Patent Office.

H. K. NELSON, OF PENN YAN, NEW YORK.

Letters Patent No. 96,468, dated November 2, 1869.

IMPROVEMENT IN PLANT-PROTECTOR.

The Schedule referred to in these Letters Patent and making part of the same.

*To all whom it may concern:*

Be it known that I, H. K. NELSON, of Penn Yan, in the county of Yates, and State of New York, have invented a new and useful Improvement in Plant-Protectors; and I do hereby declare that the following is a full, clear, and exact description of the same, reference being had to the accompanying drawings, making part of this specification, in which—

Figure 1 is a perspective view of the whole apparatus;

Figure 2, a separate view of the upper hoop and socket attached; and

Figure 3, a separate view of the standard.

My invention consists in providing a cheap, portable plant-protector and miniature hot-house, which may be placed over plants, to protect them from cold winds, and frosts, and also from insects, birds, &c., and which admits plenty of light and heat from the sun, and also retains and concentrates the heat upon the plant and hill.

It also consists in providing the plant-protector with a ventilator, which lets out the surplus heat, and which can be readily closed, to exclude frosts and cold winds.

I construct my protector in the shape of the frustum of a cone or pyramid, composed of an upper and lower hoop or frame, made of wire, or other suitable material, and connected together by oil-cloth, or other transparent or translucent material, that is pliable, and can be folded easily.

In the drawings, $a$ and $b$ are the hoops, and $c$, the cloth.

Attached to the upper hoop $a$, by a hinge, is a ventilator, $v$, which may be raised or lowered at any angle desired.

The wire socket $f$, shown at fig. 2, is also attached to the hoop $a$, and receives the upper end of the standard $s$.

To use the protector, the standard or stake $s$ is inserted in or near the hill where the plant is to grow, and the apparatus placed over it, the socket resting upon the upper end of the standard $s$, and the lower loop $b$ placed on the ground, or slightly forced into it.

The standard will hold the apparatus firmly in place, and prevent its being blown away by the wind.

When not in use, the protectors may be folded and packed away, without occupying much space.

It will be seen that this arrangement will thoroughly protect the plant, and at the same time draw and retain the heat of the sun, and admit the light freely. The ventilator will prevent the accumulation of too much heat, and allows the fresh air to circulate about the plant.

The apparatus may be enlarged, so as to answer for plants of any size.

I am aware that plant-protectors have been used, which are similar in form to mine, but these are usually covered with gauze netting or open cloth, and are without the ventilator.

What I claim as my invention, and desire to secure by Letters Patent, is—

The arrangement and combination of the hinged cap or ventilator $v$, hoops or frames $a$ $b$, transparent or translucent covering $c$, standard $s$, and wire socket $f$, substantially as and for the purposes set forth.

H. K. NELSON.

Witnesses:
BENJAMIN L. HOYT,
THEO. BOGART.